United States Patent [19]
Meeker

[11] 3,857,590
[45] Dec. 31, 1974

[54] AIR DUCT

[75] Inventor: Brian Lee Meeker, Toledo, Ohio

[73] Assignee: Johns-Manville Corporation, Greenwood Village, Arapahoe County, Colo.

[22] Filed: Jan. 17, 1973

[21] Appl. No.: 324,274

[52] U.S. Cl............ 285/305, 138/120, 138/155, 285/47, 285/DIG. 22
[51] Int. Cl............................. F16l 37/00
[58] Field of Search ......... 138/155, 175, 131, 109, 138/128, 120, 165, 166; 117/94; 156/144; 285/289, 304, 305, DIG. 22, 239

[56] References Cited
UNITED STATES PATENTS

| | | | |
|---|---|---|---|
| 1,253,902 | 1/1918 | Steinhart | 138/166 |
| 1,278,894 | 9/1918 | Falk | 285/304 |
| 1,952,381 | 3/1934 | Lunn | 138/165 |
| 2,066,473 | 1/1937 | Jorgensen | 285/239 X |
| 2,315,255 | 3/1943 | Rogers | 285/239 |
| 2,580,872 | 1/1952 | Wise | 138/131 X |
| 2,639,731 | 5/1953 | Whiting | 138/175 X |
| 2,650,114 | 8/1953 | Epstein | 285/304 |
| 2,918,314 | 12/1959 | Kemnitz | 285/239 |
| 3,503,636 | 3/1970 | Bower | 285/305 |
| 3,527,258 | 9/1970 | Farr | 138/109 X |
| 3,538,956 | 10/1970 | Helbing | 138/120 |
| 3,568,722 | 3/1971 | Runshe | 138/109 X |
| 3,716,077 | 2/1973 | Sherman et al | 138/155 X |

Primary Examiner—Richard C. Queisser
Assistant Examiner—Daniel M. Yasich
Attorney, Agent, or Firm—Robert M. Krone; John D. Lister

[57] ABSTRACT

An air duct is provided with a female ring that is mounted within one end of the air duct and a male ring that is mounted within the other end of the air duct with a portion of the male ring extending beyond the end of the air duct. The extended portion of the male ring has an outside diameter less than the internal diameter of the female ring whereby the extended portion is adapted to be inserted into a female ring of another duct. The extended portion is also provided with projecting means of greater diameter than the internal diameter of the female ring for engaging a female ring of another duct to prevent withdrawal of the extended portion of the male ring from the female ring. The flexible air duct is assembled by securing the female ring and the male ring to ends of a helical reinforcing member of the air duct. The helical reinforcing member, the female ring and a portion of the male ring are then encased within a tubular envelope with the projecting means of the male ring external of the tubular envelope.

7 Claims, 6 Drawing Figures

PATENTED DEC 31 1974 3,857,590
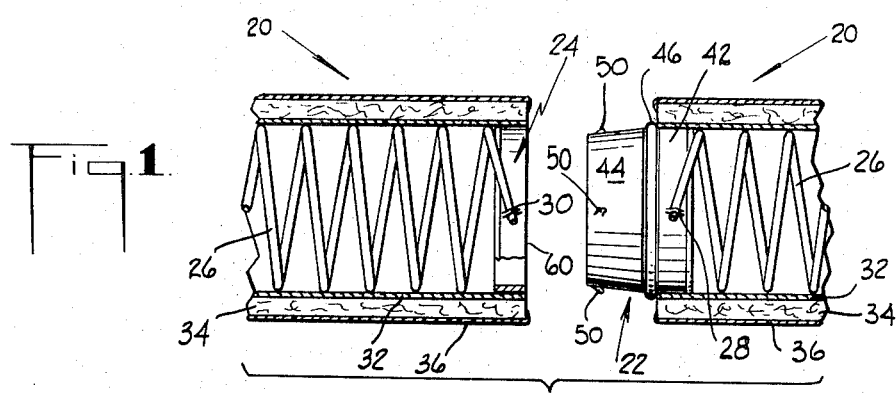
Fig. 1.
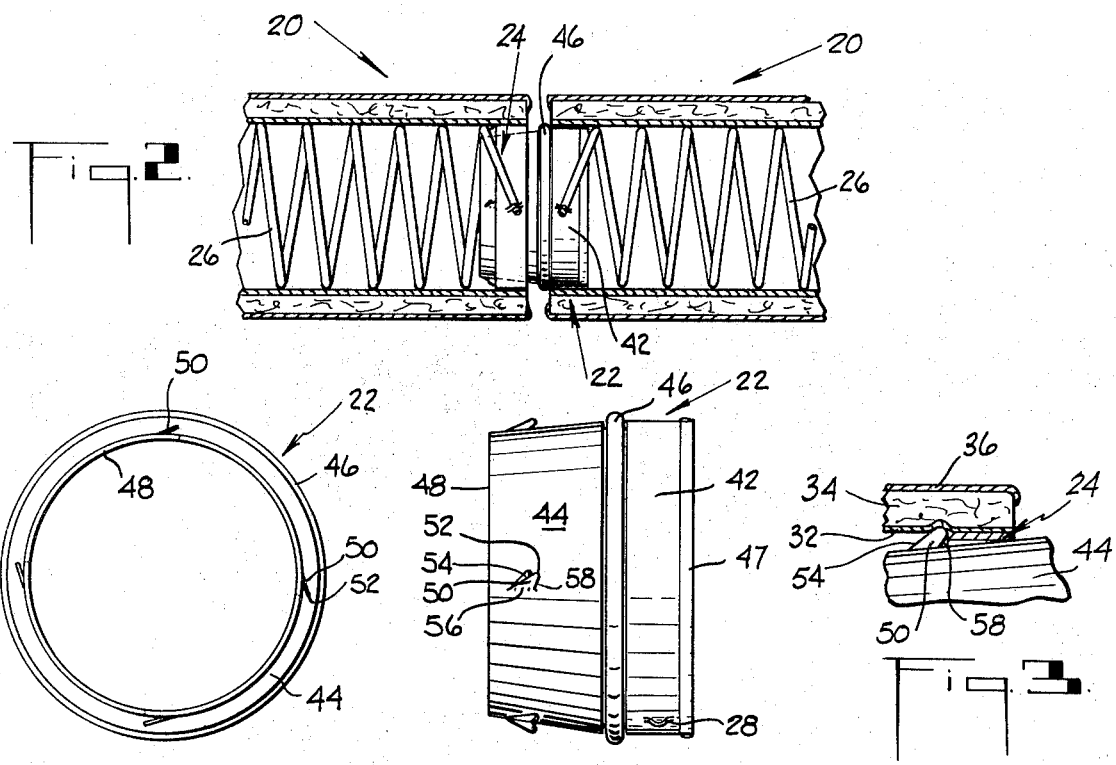
Fig. 2.
Fig. 4. Fig. 5. Fig. 3.
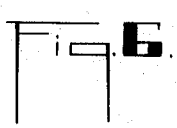
Fig. 6.

AIR DUCT

BACKGROUND OF THE INVENTION

The present invention relates to a flexible or rigid air duct and in particular to an air duct with a unique closure system and a method of making such an air duct.

Air ducts frequently used in the prior art have utilized various means to connect the duct sections in axial communication. In some instances this has been accomplished by mechanically connecting duct ends by applying tape around the joint. Such a joint sometimes includes a sleeve inserted into the end of each duct section to strengthen the joint. Another form of connection is to provide stove pipe connections at each end of a duct section for connecting one section to another. The patent to Farr, No. 3,527,258 issued Sept. 8, 1970; the patent to Runshe et al., No. 3,568,722 issued Mar. 9, 1971; the patent to Dennis et al., No. 3,583,732 issued June 8, 1971; and the application of Sherman et al., Ser. No. 73,754 filed Sept. 21, 1970 are illustrative of the prior art. However, in spite of the various connectors utilized in the prior art the need has remained for a closure system which will lock adjacent duct sections in axial alignment without the need for sheet metal screws or other means to affix the duct sections together.

OBJECT OF THE INVENTION

Consequently, it is an object of the present invention to provide a closure system for rigid and flexible air ducts which will lock adjacent air ducts in axial alignment without the need to employ screws or other auxiliary fastening means to lock the sections together.

It is a further object of the present invention to provide such a closure system in which the joint can be quickly and easily effected.

SUMMARY OF THE INVENTION

Accordingly, the present invention comprises an air duct which includes a tubular member having a female ring mounted within one end portion of the member and a male ring mounted within the other end of the member. The male ring has an extended portion which extends beyond the end of the tubular member and an inner portion which is located within the end portion. The extended portion of the male ring has an outside diameter less than the internal diameter of the female ring to facilitate entry of the male ring into a female ring of another duct. The extended portion of the male ring is provided with projecting means of greater diameter than the internal diameter of the female ring for engaging a female ring of another duct to lock the rings together once the male ring has been inserted into the female ring. The duct is made by securing the female ring and the male ring to opposite ends of a helical reinforcing member and then by encasing the reinforcing member and the rings within a tubular envelope with only the extended portion of the male ring extending beyond one end of the envelope.

BRIEF DESCRIPTION OF THE DRAWINGS

FIG. 1 is a side elevation of the ends of two sections of flexible duct with portions broken away to illustrate the manner in which the male and female connecting rings are mounted in the ducts;

FIG. 2 is a view similar to FIG. 1 with the duct sections shown locked together;

FIG. 3 is a fragmentary view of the joint of FIG. 2 illustrating the manner in which tabs of the male ring cooperate with the female ring to lock the duct sections together;

FIG. 4 is an end view of a male connector ring;

FIG. 5 is a side view of a male connector ring; and

FIG. 6 is a side view with a portion broken away of a female connector ring.

DESCRIPTION OF THE PREFERRED EMBODIMENT

The closure system of the present invention is intended primarily for use with air duct systems. While the closure system can be utilized with either rigid or flexible air duct systems, the closure system is specifically adapted for use with flexible air ducts and is illustrated in conjunction with flexible air ducts.

FIG. 1 illustrates a pair of air ducts 20 about to be coupled together by inserting a male coupling ring 22 of one duct into a female coupling ring 24 of an adjacent duct. Each duct 20 comprises a male coupling ring 22, a female coupling ring 24 and an elongate helical reinforcing member 26 which extends between and is affixed to the male and female coupling members.

The elongate helical reinforcing member 26 can be a wire, a strand of fiber glass filaments or other suitable reinforcing means. The elongate helical reinforcing member is secured to the male and female rings by passing end portions of the reinforcing member through retaining loops 28 and 30 located on an outer surface of each coupling ring. The elongate helical reinforcing member 26, the female coupling ring 24 and a portion of the male coupling ring 22 are encased within a tubular envelope which includes an inner scrim cloth 32, an intermediate layer of insulating material 34 and an outer sleeve 36 of a fluid impervious vinyl material. The elongate helical reinforcing member, the female coupling ring and the male coupling ring are affixed to the scrim cloth 32 by a conventional adhesive. The sleeve 36 retains the insulating layer 34 in place about the scrim cloth 32.

The female coupling ring 24, shown in FIG. 6, is made of sheet metal. As mentioned above, the female ring is adhesively secured to the scrim cloth 32 which forms the internal surface of the duct and a terminal portion of the elongate helical reinforcing member 26 is inserted within the retaining loop 30 of the female coupling ring where it is retained by frictional engagement. An inner annular edge 38 of the female coupling ring is provided with a folded over portion 40 which gives the inner edge 38 a smooth surface so that it does not cut the scrim cloth.

The male coupling ring 22, shown in FIGS. 4 and 5, is made of sheet metal. The male coupling ring has an inner portion 42 and an extended portion 44. An annular bead or rib 46 is provided on an external surface of the male coupling ring 24 at the juncture between the inner portion and extended portion of the male coupling ring. As mentioned above, the inner portion 42 of the male coupling ring is adhesively secured to the scrim cloth 32 and an end of the elongate helical reinforcing member 26 is retained within the retaining loop 28 provided on the outer surface of the inner portion. An inner annular edge of the male coupling ring is provided with a folded over portion which gives the inner edge 47 a smooth surface so that it does not cut the scrim cloth.

The extended portion 44 of the male coupling ring is tapered with the diameter of the male coupling ring progressively decreasing from the bead 46 to an outer edge 48 of the extended portion. A plurality of resilient tabs 50 extend outwardly from the external surface of the extended portion 44. As shown, there are four resilient tabs 50 equally spaced about the circumference of the external surface of the extended portion 44. While four resilient tabs 50 are shown, the number of tabs can be varied as required.

The resilient tabs 50 are punched out of the extended portion 44 of the male coupling member and are an integral portion of the extended portion. The tabs 50 extend outward from the external surface of the extended portion 44 with the terminal portion or tip 52 of each tab extending radially outward from the longitudinal axis of the duct a distance greater than the internal diameter of the female coupling ring and preferably outward a distance greater than the external diameter of the female coupling ring. A leading edge 54 of each tab is inclined toward the inner portion 42 (inclined away from outer edge 48) from a base 56 to the tip 52 of the tab. A trailing edge 58 of each tab extends either in a plane perpendicular to the longitudinal axis of the duct or is inclined toward the inner portion 42 of the male coupling ring from the base 56 to the tip 52 of the tab. In this way the leading edge 54 of each tab cooperates with an outer edge 60 of the female coupling member 24 as the male coupling ring 22 is being inserted into a female coupling ring to momentarily depress the tab so that it can slide through the female ring after which the resilience of the tab causes the tab to spring outward to its original position. Once the tab has sprung out into its original position, the trailing edge 58 of the tab will cooperate with the inner edge 38 of the female coupling ring to prevent the male ring from being withdrawn from the female coupling ring.

The tabs 50 are located so that the spacing between the trailing edge 58 of the tab and the bead 46 is equal to or greater than the width X of the female coupling ring. In this way, when the male coupling ring is inserted into the female coupling ring, the tabs will be able to clear the inner edge 38 of the coupling ring and spring back to their original position.

The flexible air duct is formed by supporting the helical reinforcing member on a support such as a mandrel and inserting the ends of the helical reinforcing member into the closed retaining loops 28 and 30 of the male and female coupling rings. The elongate helical reinforcing member 26 is then positioned with adjacent turns of the helical reinforcing member spaced apart and an adhesive is applied to the external surfaces of the helical reinforcing member 26, the female coupling ring 24 and the inner portion 42 of the male coupling ring 22. The scrim cloth 32 is then wrapped about the helical reinforcing member, the female coupling ring and the inner portion of the male coupling ring. The scrim cloth 32 is then encased within a fiber glass blanket insulating layer 34 which is wrapped about the scrim cloth and retained in a compressed state while sleeve 36 is drawn over the insulation to encase the insulation. Once the sleeve 36 has been drawn over the insulation layer 34, the insulation is allowed to expand whereby the insulation and the sleeve act to retain each other in place. The female coupling ring is located within the duct so that the outer edge of the female ring is substantially flush with the end of the duct. The annular rib at the juncture of the inner and extended portions of the male coupling ring abuts the end of the duct to assure that the male ring is properly positioned within the duct.

As shown in FIGS. 1, 2 and 3, adjacent ducts are coupled by inserting the male coupling ring 24 into the female coupling ring 22. As the male coupling ring is inserted into the female coupling ring the resilient tabs 50 are depressed so that they can slide through the female ring. Once the tabs 50 have cleared the inner edge 38 of the female ring, they spring back to their original positions and the trailing edges 58 of the tabs prevent the male coupling ring from being withdrawn from the female coupling ring whereby the ducts are locked together. After the ducts have been locked together, the joint can be further sealed by conventional ducting tapes or other means to complete the joint. While the gap between the ends of the coupled duct shown in FIG. 2 may appear greater, the gap is only about five-eighths of an inch or less.

The air ducts of the present invention have nominal inside diameters within a range extending from about 4 inches to about 24 inches. By way of example, a duct having a nominal inside diameter of 6 inches can have a female coupling ring 24 with an external diameter of 6 1/16 inches and a width X of 1 ¾ inches. The corresponding male coupling ring 22 for such a duct would have an inner portion 42 with an external diameter of 6 inches and an extended portion 44 with an external diameter of about 6 inches at its juncture with the inner portion and an external diameter of about 5 ¾ inches at its outer extremity. The overall length of the male coupling ring is about 5 ⅞ inches with the length of the extended portion from the annular bead 46 to the edge 48 of the ring being about 3 ½ inches. The bases 56 of each tab at its leading edge is spaced about three-eighths of an inch inward from the outer edge 48 of the coupling ring. The above dimensions are merely exemplary. They are not intended in any way to limit the invention but are only intended to further illustrate the present invention.

What is claimed is:
1. Flexible air duct comprising:
 a. a tubular member, said tubular member having a first end portion and a second end portion,
 b. a female ring, said female ring being affixed to said first end portion;
 c. a male ring, said male ring being affixed to said second end portion, said male ring having an extended portion which extends beyond the second end portion and an inner portion which is within the second end portion, said extended portion having an outside diameter less than the internal diameter of the female ring whereby the extended portion is adapted to be inserted into a female ring of another of the ducts, and said extended portion having resilient tabs extending outward from an outer surface of said extended portion to define a diameter greater than the internal diameter of the female ring, and the spacing between the tabs and the juncture between the extended portion and the inner portion of the male ring being greater than the width of the female ring whereby the tabs are adapted to cooperate with an inner annular edge of the female ring of another of the ducts to prevent removal of the male ring from the female ring.

2. The air duct of claim 1 wherein:
a. the tabs each have an inclined leading edge which is inclined away from an outer annular edge of the extended portion from a base of the tab to a free end of the tab to facilitate the insertion of an extended portion of a male ring into a female ring.

3. The air duct of claim 1 wherein:
a. the tabs each have a trailing edge which lies in a plane substantially perpendicular to a longitudinal axis of the duct.

4. The air duct of claim 1 wherein an external annular bead is located on said male ring at the juncture between the extended portion and the inner portion to limit the extent that the male ring extends into the second end portion.

5. The air duct of claim 1 wherein:
a. the male and female rings are made of sheet metal.

6. The air duct of claim 1 wherein:
a. the extended portion of said male ring is tapered with the extended portion decreasing in diameter from its juncture with the inner portion to the outer annular edge.

7. The air duct of claim 1 wherein:
a. the tubular member is flexible and said tubular member has an internal elongate, helical reinforcing member;
b. said male and said female rings have retaining means thereon for retaining ends of said helical reinforcing member; and
c. the ends of said helical reinforcing member are retained in said retaining means.

* * * * *